Figure 1:
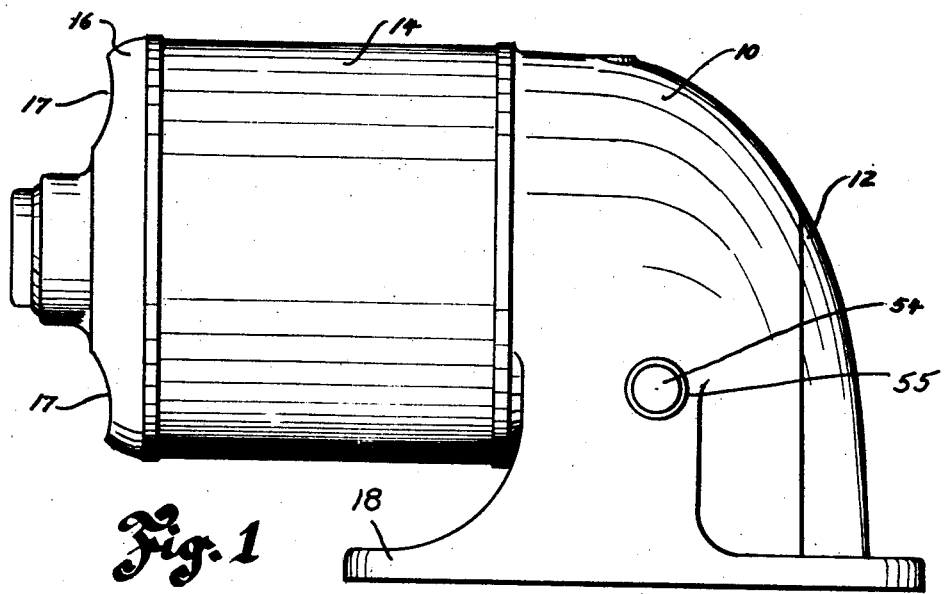

Nov. 8, 1949     C. O'DANIEL     2,487,362
DYNAMOELECTRIC MACHINE
Filed Oct. 9, 1946     2 Sheets-Sheet 1

INVENTOR:
CLARENCE O'DANIEL
BY
Roy M. Eilers
ATTORNEYS.

Nov. 8, 1949

C. O'DANIEL 2,487,362

DYNAMOELECTRIC MACHINE

Filed Oct. 9, 1946

2 Sheets-Sheet 2

INVENTOR:
CLARENCE O'DANIEL
BY
Roy M. Eilers
ATTORNEYS.

Patented Nov. 8, 1949

2,487,362

UNITED STATES PATENT OFFICE 2,487,362

DYNAMOELECTRIC MACHINE

Clarence O'Daniel, Richmond Heights, Mo., assignor to Century Electric Company, a corporation of Missouri Application October 9, 1946, Serial No. 702,261

11 Claims. (Cl. 171—252)

This invention relates to improvements in dynamoelectric machines. More particularly, this invention relates to improvements in the ventilation and cooling of dynamoelectric machines and the added rotative equipment connected to and rotatable with those machines.

It is, therefore, an object of the present invention to provide improved methods and apparatus for cooling and ventilating dynamoelectric machines and the added rotative equipment connected to and rotatable with those machines.

In the operation of dynamoelectric machines, appreciable heat is generated, most of the heat being generated in the current-carrying elements of the machines in accordance with the electrical law that current passing through a conductor will generate heat and the rest of the heat being generated because of frictional and electro-magnetic factors. The heat, however generated, must be removed from the machines to assure efficient operation thereof and the heat is usually removed by forcing cooling drafts of air through the machines. Ordinarily, fans or other air-moving devices are mounted on the rotating elements of the machines, and these fans move air through the housings of the dynamoelectric machines. Where those machines are belted to other rotative equipment or where those machines are connected to but spaced from other rotative equipment by means of mechanical or hydraulic coupling devices, the cooling and ventilating problems of the machines themselves and the cooling and ventilating problems of the rotative equipment connected to those machines are not too difficult. However, in some installations it is necessary, for reasons of cost or space, to install and operate additional rotative equipment in the housings of the dynamoelectric machines or in housings that abut the housings of the dynamoelectric machines. In those installations the cooling and ventilating problem of the machines and the added rotative equipment will be complicated by the fact that the added rotative equipment will interfere with the usual and customary ventilating and cooling system of the dynamoelectric machines and the problem will also be complicated by the fact that the heat generated by the added rotative equipment will be added to the heat generated by the dynamoelectric machines. Where a dynamoelectric machine has a gear train installed in the same housing with it or has a gear train installed in a housing that abuts the housing of the dynamoelectric machines. Where a dynamoelectric machine the gears generate considerable heat. The problem is particularly serious where those gears provide large reductions in speed. The present invention answers this problem by providing a dynamoelectric machine wherein an air-moving structure positively directs cool air over the gear-enclosing portion of the housing, thus facilitating the cooling of the gear train. It is, therefore, an object of the present invention to provide a dynamoelectric machine wherein the air-moving structure positively directs cool air over the gear-enclosing portion of the housing.

The present invention attains adequate cooling of the gear train connected to the dynamoelectric machine by providing an air duct or passage which has the gear-enclosing housing as one wall thereof and by having that duct open to the atmosphere immediately adjacent the gear-enclosing housing. Thus cool air can be brought into immediate and intimate contact with the gear-enclosing housing and can be directed along that housing absorbing heat therefrom as it moves in contact therewith. It is, therefore, an object of the present invention to provide an air duct which has the gear-enclosing portion of the dynamoelectric machine housing as one wall thereof.

After the cool air has passed through the air duct or passage, it can then be drawn into the portion of the dynamoelectric machine housing that contains the stator and the rotor. In this way the cooling air is made to cool the stator and the rotor of the dynamoelectric machine as well as the gears. Quite naturally the air will be less cool after its passage through the air duct but it will be considerably cooler than the stator and rotor and adequate cooling of the dynamoelectric machine can be obtained by moving sufficiently large quantities of air through the housing of the dynamoelectric machine. Thus it is possible to have a single stream of air perform the dual function of cooling the gear train and cooling the rotor and stator of the dynamoelectric machine. This method is quite practical because it contemplates the movement of very large quantities of air through the housing and although the temperature of the cooling air can be higher than that of the ambient air by the time it reaches the stator and rotor, it is lower than the desired temperatures of the stator and rotor. It is, therefore, an object of the present invention to provide a dynamoelectric machine wherein air is moved past the gear housing and is then moved past the rotor or stator of the dynamoelectric machine.

The present invention provides exceptionally effective cooling of the gears by lubricating them with a lightweight oil which will lap or wash against one wall of the air duct or passage through which the cooling air is moving. This lightweight oil will thus lap or wash against a constantly-cooled surface and will itself be cooled. Once the oil is cooled it will be agitated and swirled about until it can return to the gears and absorb heat therefrom. In this way the present invention provides a direct and continuous transfer of heat from the gears to the oil and from the oil to the cool wall of the air duct, and thence to the cooling air. It is, therefore, an object of the present invention to provide a dynamoelectric machine wherein lightweight oil is used to lubricate added rotative equipment and to transfer heat from that equipment to one wall of the air duct and thence to the cooling air passing through that air duct.

Other objects and advantages of the present invention should become apparent from an examination of the drawing and accompanying description.

In the drawing and accompanying description, a preferred embodiment of the present invention is shown and described but it is to be understood that the drawing and accompanying description are for the purposes of illustration only and do not limit the invention and that the invention will be defined by the appended claims.

Figure 2:
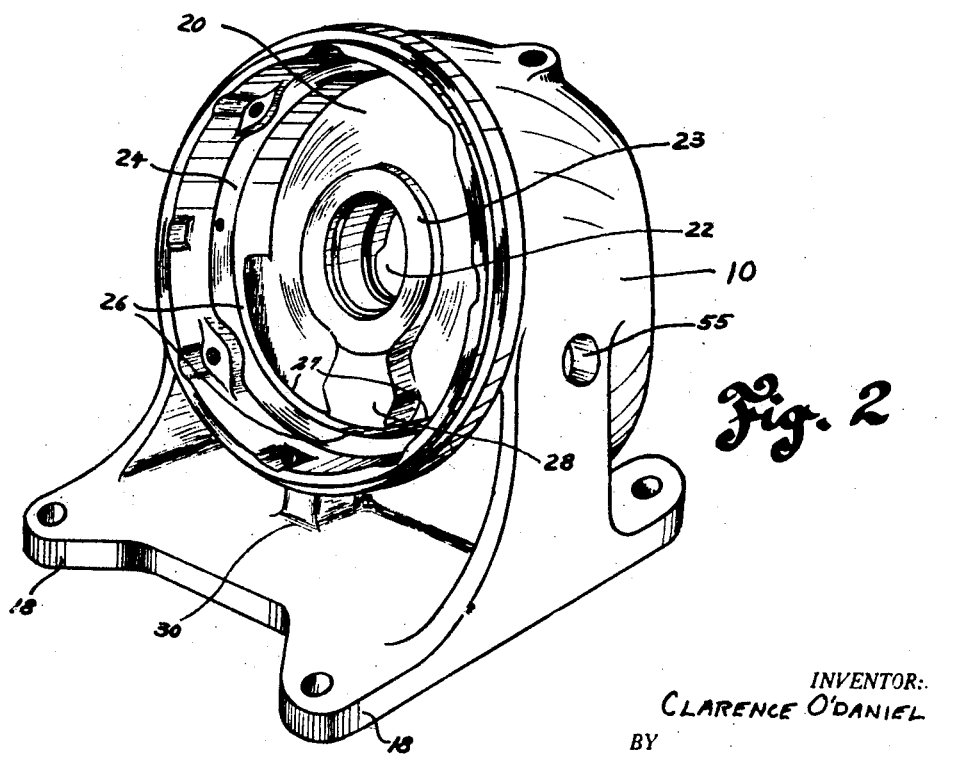
Figure 3:
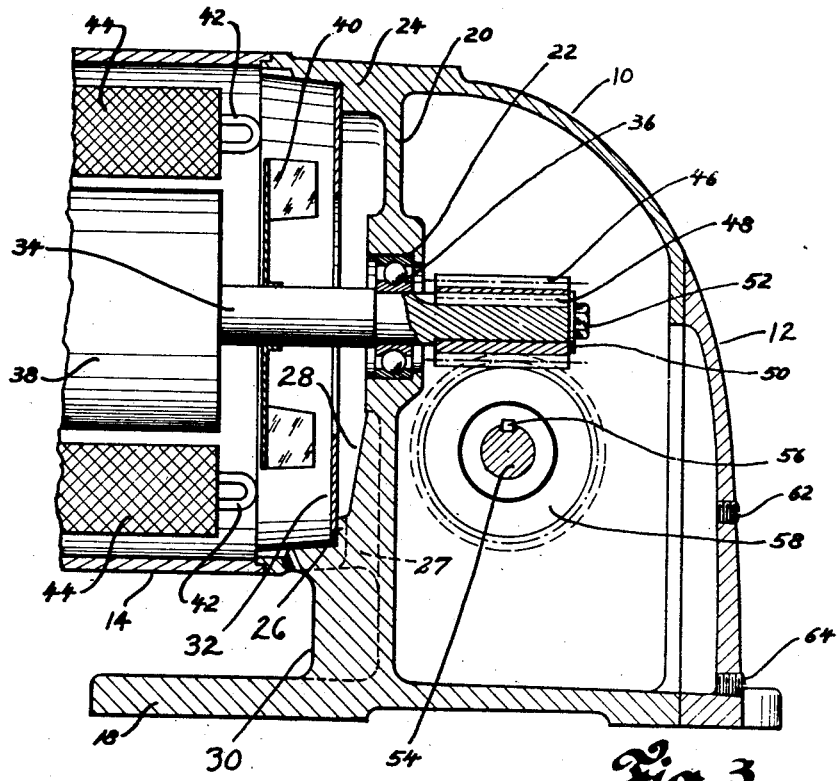
Figure 4:
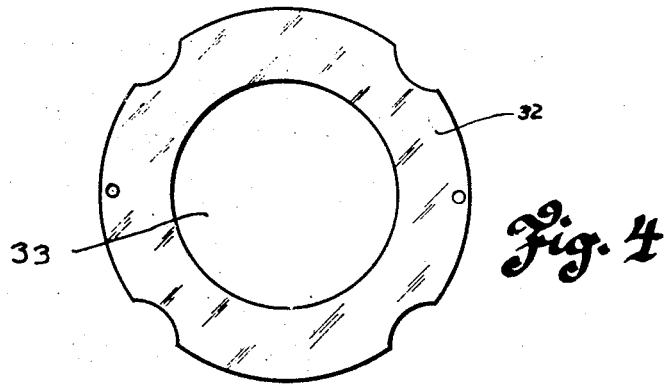

In the drawing Fig. 1 is a side elevational view of a housing that encloses a dynamoelectric machine and a gear train that is coupled to the dynamoelectric machine, Fig. 2 is a perspective view of a portion of the housing of Fig. 1 and it shows the partition between the motor section and gear section of that housing, Fig. 3 is a cross sectional view of the housing of Fig. 1, and it is taken along a vertical plane through the center of the portion of the housing shown in Fig. 2, and Fig. 4 is a front elevational view of the baffle used in the housing of Fig. 1.

Referring to the drawing in detail, the numeral 10 denotes the portion of the housing of Fig. 1 that contains the gears of a gear train, 12 denotes a closure plate for the right hand end of the housing 10, 14 is the portion of the housing of Fig. 1 that contains the rotor and stator of the dynamoelectric machine and 16 is the end bell for housing 14. The housing 10 has feet 18 that extend toward the left hand end of the housing 14 and that underlie part of the housing 14. The feet 18 cooperate with the rest of the base of housing 10 to provide adequate support for the dynamoelectric machine and the gear train connected to the dynamoelectric machine.

The housing 10 has a wall or partition 20 that separates the motor section of the housing from the gear section of the housing, and this wall or partition extends down to the base of the housing 10. Formed in partition 20 is an opening 22 that connects the motor housing with the gear housing. Extending to the left of the partition 20 and formed as a part of the housing 10, is a shoulder 24 that extends around the upper half of the housing 10. The left hand face of the shoulder 24 is spaced from the partition 20 and the lip 26 that extends between the lower ends of shoulder 24 is also spaced from partition 20. The space between the lip 26 and the partition 20 constitutes the upper end of an air duct or passage that is formed by the partition 20, the lip 26, and a baffle 28 that terminates in a web 30. The baffle 28 extends downwardly from the bearing housing 23 on partition 20 and it cooperates with the web 30 to provide two inlets 27 for the air duct. These inlets are adjacent the base of housing 10 and will permit cool air to enter the air duct and move upwardly through the air duct and contact the partition 20. Dimensioned to fit within the housing 10 and to bear against the shoulder 24 and the lip 26 which extends between the ends of shoulder 24, is an annular baffle plate 32. This baffle plate will cooperate with the partition 20, baffle 28 and rim 23 to cause air to pass over substantially all of the surface of partition 20 before it is drawn through the central opening 33 of baffle plate 32. In actual practice the shoulder 24, the lip 26, the baffle 28 and the web 30 can easily be cast integrally with the housing 10 but they can be fabricated, if desired.

Positioned partially within the housing 10 and partially within the housing 14 is a rotatable shaft 34 and this shaft is rotatably supported by a bearing, not shown, in the end bell 16 and by the anti-friction bearing 36. Mounted on and rotatable with the left hand portion of shaft 34 is a rotor 38 and a fan 40. The fan 40 is dimensioned so its blades are adjacent the inner periphery of the annular baffle plate 32, and is also dimensioned so its blades will rotate freely without striking the windings 42 of stator 44. Stator 44 is supported in the housing 14 in such a manner that air from fan 40 can pass along the outer periphery of the stator 44 and cool it. The air passing between the inner surface of housing 14 and the outer periphery of stator 44 will be discharged through the openings 17 in end bell 16.

Mounted on the right hand portion of shaft 34 is a worm gear 46; and gear 46 is secured to the shaft 34 by a key 48, end plate 50 and bolt 52. Rotatably mounted on a shaft 54, and secured thereto by key 56 is a worm wheel 58, and worm wheel 58 engages and is rotated by worm gear 46. The end of the shaft 54 projects through an opening 55 in the side wall of housing 10. The shaft 54 is supported in the housing 10 by suitable anti-friction bearings, not shown, and shaft 54 is the shaft from which power is taken off.

Mounted in the closure plate 12 are two threaded plugs 62 and 64. Plug 64 is the drain plug and plug 62 is the fill plug. By threading plug 64 tightly into place and by removing plug 62, it is possible to fill the housing 10 with oil up to the level of the plug 62. The oil should be lightweight and should be liquid throughout the temperature range experienced during the operation of the gear train in the housing 10. Under most operating conditions, oils comparable to S. A. E. 20 or 30 should be very satisfactory.

In the operation of the dynamoelectric machine, air is drawn, by means of the fan 40, toward the inlet portions of the air duct that are adjacent the base of the housing 10. Thereafter, the air will be moved against the partition 20 and will flow along that partition until it can pass through the central opening 33 of baffle plate 32. The fan 40 is dimensioned to move very large quantities of air, and these large quantities of air will distribute themselves around the inner periphery of baffle plate 32, thus insuring that substantially all portions of the surface of partition 20 will be contacted by the cooling air. Upon its issuance from the opening 33 in the baffle plate 32, part of the air will pass by the stator windings 42 and flow over the outer periphery of the stator 44 while the rest of the air will pass through the annular gap between the rotor 38 and the stator 44. Regardless of the path it follows, the air will reach the left hand end of the housing 14 where it can escape through openings 17 of end bell 16. While the air was passing along the partition 20, the oil in the housing 10 was being agitated and swirled by the gear 58. As a result this oil was enabled to contact the gears 46 and 58 and absorb heat from them and then move into contact with partition 20 and lap and wash against that partition, thus transferring its heat to the partition 20. Because the partition 20 is constantly being cooled by the air, the partition cools the oil and the cooled oil absorbs additional heat from the gears when it again comes into contact with them.

The construction shown in the drawing has proved to be successful and to provide completely adequate cooling. For example, "hot spot" temperatures in the gear housing and motor housing are usually less than one hundred and fifty (150) degrees Fahrenheit and are almost always under two hundred (200) degrees Fahrenheit. In special installation, however, where unusually cool operating temperatures are desired, the partition 20 can be provided with heat-dissipating fins and the exterior of the housing can be provided with heat-dissipating fins to facilitate still further dissipation of heat.

It will be noted that the drawing shows the rotor attached to and rotatable with a gear train. Such a construction has been shown to be highly successful and useful, but the present invention is not limited to gear motors alone. Instead, the present invention can be used with many constructions wherein various added rotative equipment is enclosed in the same housing with a dynamoelectric machine.

It will further be noted in the drawing that a two-piece housing encloses both the gears and the rotor and stator of the dynamoelectric machine and in actual practice each of the pieces is provided with removable end plates, as shown. However, the housing need not be made in two parts but can be made as one or more individual pieces which can be provided with suitable closure plates. For the purposes of convenience and accuracy in describing and understanding the present invention, the housing will be considered and referred to as being a one-piece housing that has two sections; one section for the gears and one section for the rotor and stator of the dynamoelectric machine. Accordingly, whenever the terms "gear section" and "motor section" or "gear housing" and "motor housing" are used in referring to the present invention, those terms are not intended to indicate that completely separate and distinct housings or enclosures are required for the driving and driven portions of the present invention, but instead are intended to indicate a housing of one or more pieces.

It will further be noted that the right hand end of the gear housing has a large surface area that is directly contacted by the surrounding air. This makes it possible for the right hand end of the gear housing to radiate appreciable amounts of heat to the surrounding air and thus dissipate at least a portion of the heat generated by the gears. In this way, the right hand end of the gear housing cooperates with the air duct, part of which is formed by the left hand end of the gear housing, to dissipate heat from the gears. In both instances, the lightweight lubricant will lap or wash against the walls of the gear housing and will provide direct and continuous transfer of heat from the gears to the wall. Thus an efficient method of positively carrying the heat from the point of generation to the point of dissipation is positively provided.

Air will be moved from the proximity of the dynamoelectric machine housing to the inlets of the air duct in a more or less random fashion. That air could pass along under the bottom of the motor section or it could be drawn from the vicinity of the gear section; but in either instance some initial cooling of the dynamoelectric machine housing will be effected. Once the air is within the air duct, however, its movement is not in random fashion but is definitely controlled by the walls of the duct and the sucking action of the air-moving means. The air will be drawn along the face of the gear housing and will act to absorb heat from that face. Thereafter, it will be moved axially through the motor housing to absorb heat from the stator or rotor before it is discharged from the outlets at the left hand end of the dynamoelectric machine housing.

As the air is discharged from the outlet, it will tend to set up currents of air that will parallel its movement and flow in the same direction, and these currents of air will cause a movement of air over the left hand end of the motor housing. This secondary movement of air will act to provide additional cooling of the dynamoelectric machine housing and this additional cooling effect will cooperate with the cooling effect of the air, as it flows around the dynamoelectric machine in random fashion before it is drawn into the air duct, to provide extremely efficient cooling of the dynamoelectric machine. Moreover, by having the air duct intermediate the ends of the dynamoelectric machine housing, the present invention attains cooling of the portion of the machine that would normally receive but little cooling effect. From this it is apparent that the present invention attains an initial and a secondary cooling effect, and that it applies the coolest air to the portion of the machine that would normally receive but little cooling effect and that must operate at relatively low temperatures.

Although a preferred embodiment of the present invention has been shown and described in the drawing and accompanying description, it should be obvious to those skilled in the art that various changes may be made in the form of the invention without affecting the scope of that invention.

What I claim is:

1. In a dynamoelectric machine, a stator and rotor, added rotative equipment connected to and rotatable with said rotor, a housing enclosing said rotor, stator and added rotative equipment, a partition disposed between said rotor and stator and said rotative equipment, and an air-directing element that cooperates with said partition to form an air duct in said housing intermediate the ends of said housing, said air duct contacting and being in heat-transferring relation with the lubricant for said added rotative equipment and being arranged to absorb heat from said lubricant, said duct also being adapted to conduct air past said stator or rotor.

2. In a dynamoelectric machine, a housing, a rotor and stator in one portion of said housing, added rotative equipment in another portion of said housing, spaced air-directing elements that form an air duct in said housing intermediate said portions of said housing, said other portion of said housing being in heat-transferring relation with said air duct, and air-moving means to move air through said duct.

3. In a dynamoelectric machine, a compartmented housing, a rotor and stator in one of the compartments of said housing, added rotative equipment in another compartment of said housing, an air duct intermediate the said one and the said other compartments of said housing, lightweight lubricant in said other compartment of said housing, and air-moving means in said housing, said lubricant being adapted to contact said added rotative equipment and to lap or wash against said air duct.

4. In a dynamoelectric machine, a housing, a rotor and stator in said housing, added rotative equipment in said housing, an air duct having spaced walls and an inlet intermediate the ends of said housing, said air duct having one wall thereof forming part of an enclosure for said added rotative equipment, and air-moving means in said housing.

5. In a dynamoelectric machine, a compartmented housing, a rotor and stator in one of the compartments of said housing, added rotative equipment in another of the compartments of said housing, a shaft extending between and connecting said rotor and said added rotative equipment, a partition wall that closely surrounds said shaft and is disposed between said rotor and said added rotative equipment, an annular baffle plate that surrounds but is spaced radially outwardly of said shaft, said baffle plate coacting with said partition wall to form an air duct intermediate the said one and the said other compartments of said housing, said air duct forming a part of the wall between said compartments, and air-moving means in said housing.

6. In a dynamoelectric machine, a compartmented housing, a rotor and stator in one of the compartments of said housing, added rotative equipment in another of the compartments of said housing, an air duct intermediate the said one and the said other compartments of said housing, said air duct forming a part of the wall between said compartments, lightweight lubricant in said other compartment of said housing, and air-moving means in said housing, said lubricant being adapted to contact said added rotative equipment and to lap or wash against said air duct and to transfer heat from said added rotative equipment to said air duct.

7. In a dynamoelectric machine, a compartmented housing, a rotor and stator in one of the compartments of said housing, added rotative equipment in another of the compartments of said housing, an air duct adjacent the inner ends of the said compartments of said housing, said air duct having an outlet adjacent the outer end of said one compartment, lightweight lubricant in said other compartment of said housing, said other compartment of said housing having a large exposed surface area, and air-moving means in said housing, said air-moving means drawing air into said duct and directing it into heat-transferring relation with said lubricant.

8. In a dynamoelectric machine, a compartmented housing, a rotor and stator in one of the compartments of said housing, added rotative equipment in another of the compartments of said housing, spaced air-directing elements that form an air duct intermediate the said one and the said other compartments of said housing, lightweight lubricant in said other compartment of said housing that is adapted to transfer heat to said air duct, said other compartment of said housing having a large exposed surface area, and air-moving means in said housing.

9. In a dynamoelectric machine, a compartmented housing, a rotor and stator in one of the compartments of said housing, added rotative equipment in another of the compartments of said housing, an air duct adjacent said other compartment of said housing, an air inlet, an air outlet, lightweight lubricant in said other compartment of said housing, and air-moving means in said housing, said air duct being disposed intermediate said air inlet and said air outlet whereby said air duct and said air-moving means are adapted to direct air against said other compartment and absorb heat from said lightweight lubricant and thereafter pass said air through said one compartment and absorb heat from said stator.

10. In a dynamoelectric machine, a stator and rotor, added rotative equipment connected to and rotatable with said rotor, a housing enclosing said rotor, stator and added rotative equipment, an air duct in said housing intermediate the ends of said housing, and lubricant contacting said added rotating equipment, said air duct contacting and being in heat-transferring relation with the lubricant for said added rotative equipment and being arranged to absorb heat from said lubricant.

11. In a dynamoelectric machine, a housing, a partition that divides said housing into two compartments, one of said compartments being substantially oil-tight, a shaft that is rotatably secured to and extends through said partition, a rotor secured to one end of said shaft, a stator surrounding said rotor and adapted to cause rotation of said rotor, an air-directing element adjacent said partition to direct air along said partition, added rotative equipment secured to the other end of said shaft, a fan carried by said shaft, said added rotative equipment being rotatably positioned in said substantially oil-tight compartment, said rotor and said fan being rotatably positioned in said other compartment, said fan being adapted to successively pass air along said partition and then past said stator.

CLARENCE O'DANIEL.

REFERENCES CITED

The following references are of record in the file of this patent:

UNITED STATES PATENTS

| Number | Name | Date |
| --- | --- | --- |
| 920,052 | Hamilton et al. | Apr. 27, 1909 |
| 1,673,012 | Meunier | June 12, 1928 |
| 1,746,991 | Bucklen | Feb. 11, 1930 |
| 2,058,572 | Delaval | Oct. 27, 1936 |